United States Patent [19]

Schwerzler et al.

[11] Patent Number: 4,821,828
[45] Date of Patent: Apr. 18, 1989

[54] DYNAMIC ABSORBER FOR MOTOR VEHICLE

[75] Inventors: Dennis D. Schwerzler, Troy; George C. Foltz, East Detroit, both of Mich.

[73] Assignee: General Motors Corporation, Detroit, Mich.

[21] Appl. No.: 59,015

[22] Filed: Jun. 8, 1987

[51] Int. Cl.⁴ .............................................. B60K 11/04
[52] U.S. Cl. .................................. 180/68.4; 180/300; 181/207; 248/635
[58] Field of Search ...................... 180/68.4, 68.5, 312, 180/300; 248/559, 635; 267/140.1; 165/67; 181/204, 207

[56] References Cited

U.S. PATENT DOCUMENTS

| | | | |
|---|---|---|---|
| 4,345,641 | 8/1982 | Hauser | 180/68.4 |
| 4,538,697 | 9/1985 | Muroi et al. | 180/68.4 |
| 4,651,816 | 3/1987 | Struss et al. | 180/68.4 |
| 4,662,432 | 5/1987 | Suzuki | 180/68.4 |

FOREIGN PATENT DOCUMENTS

| | | | |
|---|---|---|---|
| 2722926 | 11/1978 | Fed. Rep. of Germany | 180/68.4 |
| 0060911 | 4/1982 | Japan | 180/68.4 |
| 0036722 | 3/1983 | Japan | 180/68.4 |
| 0202937 | 11/1984 | Japan | 180/68.4 |
| 0016130 | 1/1986 | Japan | 180/68.5 |

Primary Examiner—Charles A. Marmor
Assistant Examiner—Brian L. Johnson
Attorney, Agent, or Firm—R. L. Phillips

[57] ABSTRACT

A dynamic absorber for a motor vehicle comprises the engine, radiator, air conditioning condenser and electric radiator fan all supported on a module support to form a module. The module is mounted on the vehicle body with elastic mounts with the center of gravity of the module located approximately at the anti-node of the vehicle body. Both the module and the idle speed of the engine are tuned to the first major beaming mode of the vehicle body.

3 Claims, 6 Drawing Sheets

DYNAMIC ABSORBER FOR MOTOR VEHICLE

TECHNICAL FIELD

This invention relates to dynamic absorbers for motor vehicles and more particularly to those for preventing shaking of components of the vehicle by the engine while idling and also operating on rough roads.

BACKGROUND OF THE INVENTION

It is known to use the engine radiator by isolation mounting thereof as a dynamic absorber mass to reduce body shake caused by rough roads and alternatively by the engine while idling. It is also known to use a bumper by isolation mounting thereof as a dynamic absorber mass to reduce vehicle body shake at engine idle. However, there can still remain a significant amount of vehicle component vibration such as at the steering column and front seat under certain operating conditions that is difficult to eliminate in a cost effective manner. For example, given a uni-body structure with the normal location of the radiator and front bumper and a relatively difficult to balance engine such as a 4-cylinder in a front wheel drive power train arrangement, the conventional way of increasing the effectiveness of either the radiator or bumper as an absorber to reduce steering column and front seat vibration is to increase the mass of these absorbers. But this adds a fuel burden as well as the direct cost of an added mass which serves no other useful purpose. Furthermore, conventional tuning is a compromise between absorbing the idle shake and rough road shake and is thus not best suited to either.

SUMMARY OF THE INVENTION

The present invention is an improved dynamic absorber that utilizes the masses of normally existing vehicle components in addition to the radiator and separate from the bumper and in addition maximizes their effectiveness with a strategic elastomerically supported modular arrangement and location thereof. And thus there is no added fuel or cost burden while their combined effect by strategic tuning as well as location is made to contribute beyond that normally expected. Moreover, the effectiveness of the suspended module of normally existing vehicle components as a dynamic absorber is even further enhanced by tuning the engine idle speed in a complementary manner as will now be further explained.

Figure 1:
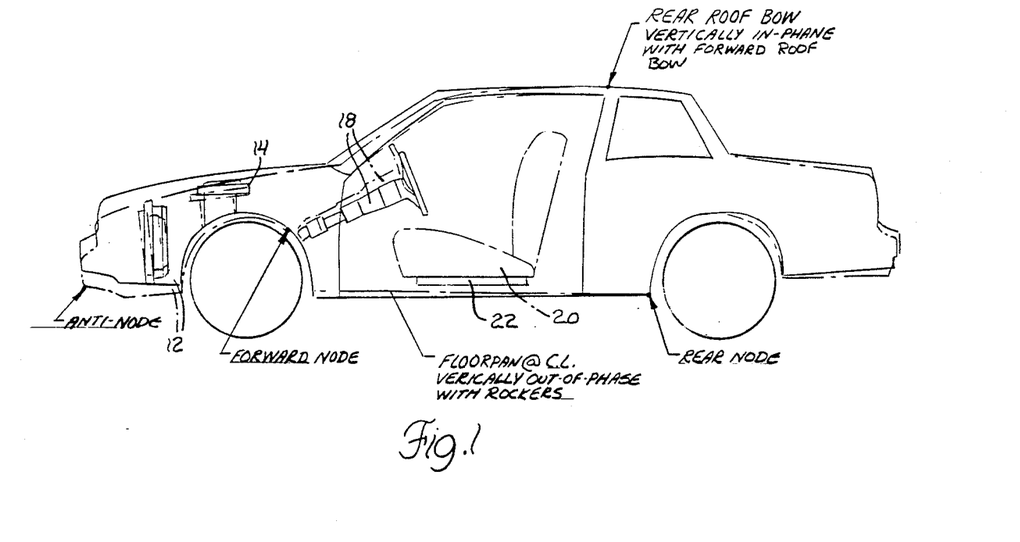
FIG. 1 is a side view of the preferred embodiment showing the anti-node location at the front end of the vehicle where the front bumper is located.

In the vibration analysis of a motor vehicle, it is common practice to relate to the "first major beaming mode" of the vehicle. This is defined as the lowest natural frequency of the sprung or suspended structure of the vehicle that is more symmetrical about the longitudinal centerline of the vehicle than anti-symmetrical. Sometimes the first major beaming mode is also referred to as the first front end beaming mode because most of the movement or vibration is in the front end of the vehicle. For example, for uni-body type construction vehicles with front wheel drive, this natural frequency (also called mode or resonance) is usually in the 18–25 Hz (cycles per second) frequency range with most of the vibratory movement occurring at the vehicle's front end. Such a vehicle is shown in FIG. 1 with the solid lines representing the undeformed shape of the vehicle in side elevation and the dot-dash lines representing the deformed mode shape greatly exaggerated for the first major beaming mode of the vehicle. This mode shape depicts the deformed motion the vehicle undergoes many times in a second. The mode shape shown is at an instant of time when the deformation reaches its maximum deflection in one direction. Actually, the vehicle oscillates about a certain point or points located on the vehicle in both directions (opposite directions) during each cycle of motion. In this case there are two such points designated forward and rear in FIG. 1 approximately at the front axle and just forward of the rear wheel. These points are called node points and are defined as a location on the vehicle that does not move in that mode. Conversely, an anti-node is a point of maximum movement in that mode and it is seen in FIG. 1 that such a node exists at the front end of the vehicle where the front bumper is located.

The typical radiator location is intermediate the forward node and the anti-node at the front end of the vehicle. Since the radiator is so near the anti-node, it experiences considerable motion or vibration produced by the first major beaming mode being excited by the engine torque pulses. Thus the radiator without relocation and by being properly suspended on the vehicle structure can be very effective as a dynamic absorber as is well known in the vibration art.

The present invention makes use in those vehicles having an air conditioning system and an electric radiator fan of not only the radiator but also the air conditioning system's condenser and such fan to form a dynamic absorber module or unit that resultantly has about double the mass of the radiator alone. Moreover, the effectiveness of such absorber module is even further increased by locating its center of gravity at or very close to the anti-node and tuning both the absorber module and the engine idle speed to the first major beaming mode. Tuning the absorber relates to the providing of a suspension system therefor such that the resulting sprung module has the same frequency as the first major beaming mode whereas tuning of the idle speed relates to simply its adjustment (typically downward with a 4-cylinder engine) from normal to this same frequency. The resulting dynamic absorber together with the engine idle speed also tuned to the first major beaming mode not only produces significant improvement (reduction) in vehicle idle shake but also significantly improved rough road vehicle shake though the combining of such engine idle tuning would normally be considered opposite to achieving the latter improvement as well. However, it was found that such engine idle tuning to the first major beaming mode improves rough road vehicle shake as well as idle shake by decreasing the participation of the beaming natural frequency of the vehicle to rough road inputs.

With the foregoing in mind, it is thus an object of the present invention to provide in a vehicle a new and improved dynamic absorber of increased effectiveness without a significant or offsetting fuel burden and/or cost.

Another object is to provide in a vehicle a dynamic absorber utilizing normally existing vehicle components in addition to the radiator and other than the bumper that are all strategically located and tuned together with the engine to the first major beaming mode of the vehicle so as to reduce both vehicle idle shake and rough road vehicle shake.

Another object is to provide in a vehicle a dynamic absorber comprising a suspended module formed of an engine radiator, air conditioning condenser and electric radiator fan whose combined center of gravity is located at or close to the maximum anti-node of the vehicle and wherein both the module and the engine are tuned to the first major beaming mode.

DESCRIPTION OF PREFERRED EMBODIMENT

These and other objects, features and advantages of the present invention will become more apparent from the ensuing detailed description taken in conjunction with the accompanying drawings wherein.

Figure 2:
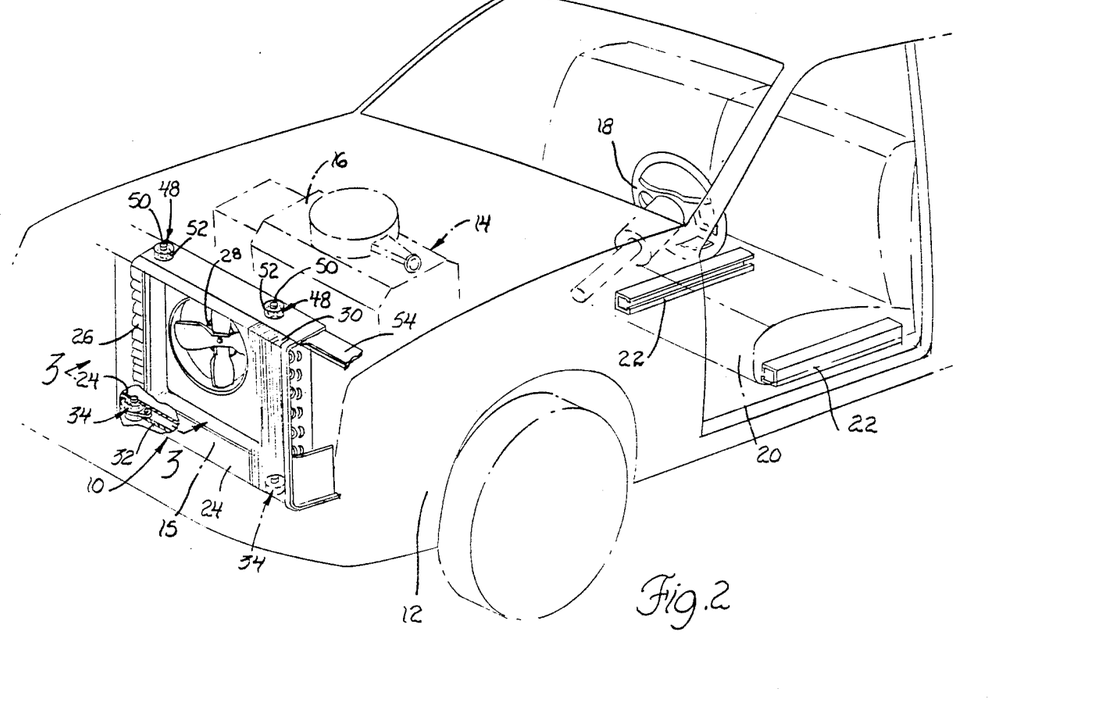
FIG. 2 is an isometric view of the preferred embodiment of the dynamic absorber module installed in the front end of a passenger car whose front end, front wheel drive power train, steering column and front seat including track are shown generally in phantom outline.

Referring to FIG. 2, there is shown a dynamic absorber module 10 according to the present invention mounted in the front end of the uni-body structure 12 of a passenger car ahead of its front wheel drive powertrain 14 and as close as practical to the anti-node which exists at the foremost extent of the front bumper 15. The powertrain has a 2-liter 4-cylinder engine 16 with a high level of shake as compared for example to 6 and 8 cylinder engines and the front wheels (not shown) are steered from a steering column 18 by a driver seated upon a front seat 20 mounted on a track 22 on the uni-body floor all in conventional manner.

Figure 3:
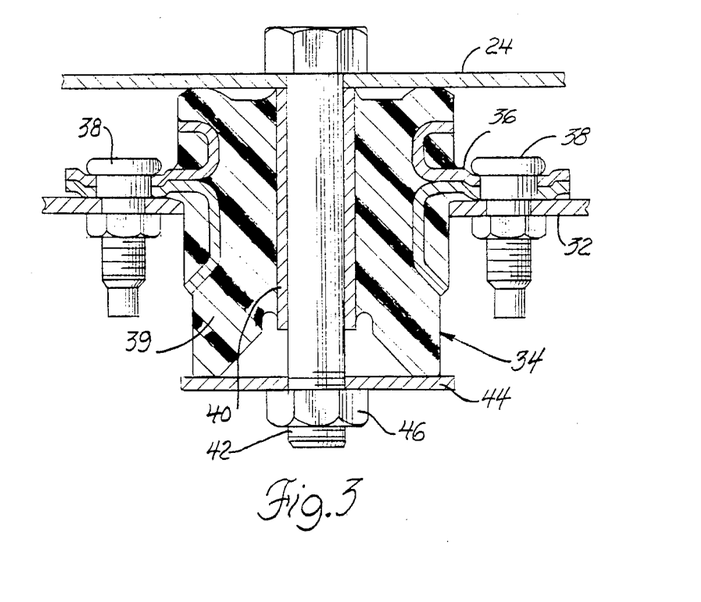
FIG. 3 is a view taken along line 3—3 in FIG. 2 of one of the lower module mounts.

The dynamic module comprises a steel pan forming a module support 24 on which are rigidly mounted the engine's radiator 26, an electric fan 28 for the radiator and a condenser 30 serving the vehicle's air conditioning system whose remaining components are not shown. Preferably, the radiator is bolted to the pan or module support and the condenser and fan are clipped with metal straps to the radiator. The module's pan is elastomerically supported on a cross-piece 32 of the uni-body by two laterally spaced lower mounts 34 whose details are shown in FIG. 3 and accept the full mass of the module. These mounts comprise a two-piece sheet metal bracket 36 that is secured by studs 38 to the cross-piece 32 and supports centrally thereof an elastomeric bushing 39 that is bonded thereto. A vertically oriented steel sleeve 40 is bonded in a similarly oriented bore through the bushing and a bolt 42, washer 44 and nut 46 secure the mount sleeve to the module pan and thus the latter to the uni-body through the medium of the elastomeric support 39.

The module is located at its top as seen in FIG. 2 by two laterally spaced upper mounts 48 which each have a slider pin 50 that is attached to the top of the radiator and is slidably received in an elastomeric bushing 52 attached to an upper sheet metal tie bar 54 of the unibody. The upper mounts serve merely to guide vertical module movement and restrain against excessive upper module movement both vertically and at right angles thereto and do not significantly affect the tuning of the module with the lower mounts as described in more detail later. Furthermore, it will be understood that the connections of the condenser in the air conditioning system (AC) are routed and made to allow relatively free movement of the module on the lower mounts 34 so as to not significantly affect the module tuning. Moreover, there is provided sufficient clearance between the module and its surroundings so as to avoid rubbing or abutment therewith during the anticipated amplitudes of the module which could also upset or change the pitch tuning of the lower mounts.

Describing the methodology in applying the invention and the improvements provided thereby in the vehicle shown, it was known as earlier discussed that the first major beaming mode occurs with the 4-cylinder engine idle shake where the second order torque pulses usually around 25 Hz excite the first beaming mode of the vehicle usually around 23 Hz. Each module component is weighed as it would normally exist in the vehicle. The radiator was weighed both with and without water so as to determine the mass of the volume of water that the radiator holds. Table 1 below lists the breakdown of the various components in the module.

TABLE 1

| MASS BREAKDOWN OF THE RADIATOR - AC CONDENSER - FAN DYNAMIC ABSORBER MODULE | |
| --- | --- |
| AC CONDENSER (MEASURED) | 1.99 kg |
| FREON (ESTIMATED 1 PT LIQUID) | 0.47 |
| FAN (MEASURED) | 2.39 |
| RADIATOR (MEASURED) | 4.40 |
| WATER (MEASURED) | 3.10 |
| SUPPORT PAN | 1.70 |
| TOTAL | 14.05 kg |

The Freon in the condenser was estimated based on the volume of the condenser and assuming a liquid density of water. As can be seen in Table 2, the radiator filled with water is the dominate mass of the module. It is slightly over 50% of the mass of the entire module while the support pan weighed only 1.7 kg and could be made even lighter by the addition of holes and/or by using lighter gage material.

The total mass of the module as shown in Table 1 was 14.05 kg which for a dynamic absorber on a vehicle is a very large mass. For example, the next largest known to the inventor for a vehicle with a similar engine is about 6 kg but that absorber was for dampening out a high frequency noise. In order to have a significant affect on the first major beaming mode of the vehicle the absorber mass needs to be considerably heavier than the latter and it was found that the normally existing radiator, AC condenser and electric fan and their normal close location was ideally suited to such utilization.

The center of gravity of the module must be determined in the fore-aft and lateral direction to properly locate same for best effect as a dynamic absorber close to the anti-node and this is simply accomplished using the knife edge technique. The lateral location turned out to be very close to the midpoint of the radiator. This is probably due to the fact that the radiator is the dominate mass of the module and that the fan is offset to the right of the radiator about the same amount that the condenser extends beyond the radiator to the left as viewed in FIG. 2. The fore-aft location turned out to be directly under the radiator. Again, the mass of the fan behind the radiator probably offsets the mass of the condenser in front of the radiator. The mounting of the module is arranged in the vehicle so that the module's center of gravity as thus determined is located at or as close as practical to the anti-node of the vehicle which location is forward of the drive train close behind the front bumper.

A pure vertical bounce mode of the module is desired and this is provided by locating the two lower module support mounts 34 on the same fore-aft plane as the module's center of gravity and in addition spacing them apart laterally an equal distance from such center which in this case required that they be unsymmetric to the centerline of the vehicle. The lower mounts are preferably shear type mounts as they provide a soft vertical rate but stiff side rates and in addition have vertical stop constraints and are readily interchangeable to obtain the proper tuning as will now be described. And in describing such tuning, it will be recalled that the necessary connections of the module components with their respective systems and the upper mounts are selected so as to have no significant affect on the module tuning.

In the procedure of tuning, sets of test or tuning mounts for the module support on the pan were obtained having a tuning frequency variation of approximately 2 Hz from 20 to 34 Hz so as to cover the potential major frequencies at which the module might have some significant effect in the vehicle. Table 2 below lists the key tuning information for the vehicle in FIG. 2 and it will be observed that the normal idle speed of 800 RPM or 26.7 Hz is above the first major beaming mode of 23.2 Hz while the steering column resonances were approximately 34 Hz and those of the brake booster (not shown) were approximately 31 Hz.

TABLE 2

KEY TUNING INFORMATION ON THE FIG. 2 VEHICLE

| | | |
|---|---|---|
| A. | IDLE SPEED (800 RPM - IN DRIVE WITH FULL ACCESSORY LOAD) | 26.7 Hz |
| B. | FIRST MAJOR BEAMING MODE OF THE VEHICLE | 23.2 Hz |
| C. | STEERING COLUMN VERTICAL NATURAL FREQUENCY | 34.2 Hz |
| D. | STEERING COLUMN LATERAL NATURAL FREQUENCY | 35.7 Hz |
| E. | BRAKE BOOSTER VERTICAL NATURAL FREQUENCY | 30.6 Hz |
| F. | BRAKE BOOSTER LATERAL NATURAL FREQUENCY | 31.2 Hz |
| G. | MAXIMUM DISPLACEMENT OF MODULE AT IDLE (20.6 Hz) | +−0.27 mm |
| H. | MAXIMUM DISPLACEMENT OF MODULE ON ROUGH ROAD 5-15 Hz RANGE | +−2.0 mm |
| I. | MAXIMUM DISPLACEMENT OF MODULE ON ROUGH ROAD 15-30 Hz RANGE | +−0.91 mm |

Each of the sets of test mounts were put into the vehicle and tested to determine their actual natural frequency and their affect on both idle shake and rough road shake.

The Table 2 information is for both durability testing and design clearance with the expected maximum vertical displacement of the module being what would be expected to occur on a generally rough road at 45 MPH. The estimated maximum displacement in the 5 to 15 Hz range is in the ±2.0 mm range. For the 15 to 30 Hz range, the estimate is ±0.9 mm. It is desirable to have the module working as a dynamic absorber even at a higher level of road roughness and therefore the vertical clearance and support mount stops were set at ±2.5 mm of travel. Moreover, the mount stops are arranged or spaced so as to take into account their static elastomeric deflection due to the mass of the module they continuously carry.

Table 3 below lists the different mounts tried and their calculated and actual tuning effects.

TABLE 3

MODULE NATURAL FREQUENCIES AND PEAK ACCELERATION VALUES

| | STATIC RATE OF MTS. (N/mm) | DYNAMIC RATE OF MTS. 25 Hz +−0.1 MM AT 67 N PRELOAD (N/mm) | CALCULATED NAT. FREQUENCY (Hz) | IMPACT NATURAL FREQUENCY (Hz) | DURING IDLE (Hz) (G's) | PEAK ROUGH ROAD (Hz) (G 2/Hz) |
|---|---|---|---|---|---|---|
| A. | 103 | 128 | 21.5 | 19.1 | 18.8 | 17.5 |
| | 102 | 130 | | | 07.5 DB | −13 DB |
| B. | 112 | 143 | 22.2 | 19.7 | 20.5 | NA |
| | 112 | 131 | | | −7.1 DB | |
| C. | 118 | 151 | 23.3 | 19.9 | 20.6 | 18.5 |
| | 120 | 150 | | | −6.7 DB | |
| D. | 137 | 183 | 25.6 | 20.5 & 25.5 | 21.2 | 19. |
| | 141 | 180 | | | −8.0 DB | −17 DB |
| E. | 165 (MODIFIED) | 200 | 27.0 | 26.1 | 21.5 | NA |
| | 154 (MODIFIED) | 205 | | | −8.0 DB | |

TABLE 3-continued

MODULE NATURAL FREQUENCIES AND PEAK ACCELERATION VALUES

| | STATIC RATE OF MTS. (N/mm) | DYNAMIC RATE OF MTS. 25 Hz +−0.1 MM AT 67 N PRELOAD (N/mm) | CALCULATED NAT. FREQUENCY (Hz) | IMPACT NATURAL FREQUENCY (Hz) | DURING IDLE (Hz) (G's) | PEAK ROUGH ROAD (Hz) (G 2/Hz) |
|---|---|---|---|---|---|---|
| F. | 165 (MODIFIED) 165 | 240 (EST) | 19.4 (EST) | NA | 21.5 −7.0 DB | NA |
| G. | 165 154 | 261 247 | 30.3 | NA | 21.5 −11. DB | NA |
| H. | 165 165 | 289 295 | 32.4 | 27.8 | 27.0 −9.4 DB | 23. −22 DB |
| I. | 200 200 | 320 (EST) | 33.9 | 30.4 | 28.2 10.4 DB | NA |
| J. | LOCKED | | | 38.3 | 21.5 −17. DB | 23. −27 DB |

NA (NOT AVAILABLE)

Referring to Table 3, the first column lists the static rate by which the manufacturer measures the mount. The second column lists the mount's measured dynamic rate. These mounts were tested at 25 Hz and ±0.1 mm and 67 N preload with the latter based on ½ the weight of the module. The amplitude was chosen to be in the average range of motion expected for the module at idle. The actual test data showed the worst case to have a peak amplitude of ±0.27 mm at 20.6 Hz for idle shake. The third column is the calculated natural frequency of the module given the mass of the module and the dynamic stiffness rates of the mounts. The fourth column is the peak frequency measured on the module using an impact hammer to excite the resonance of the module. However, with this type of test there is the problem that the first major beaming resonance of the vehicle is also excited and will affect the response of the module. Because of this interference, the peaks showed only slight correspondence to the calculated natural frequencies whereas better correlation would be expected in testing to check the tuning of the module by eliminating the first major beaming resonance of the vehicle. The 25.6 Hz tuning mounts showed the characteristic two lobe response of a correctly tuned dynamic absorber. This set of mounts was also the one most effective in reducing idle shake, it being estimated that the calculated natural frequencies are about 2 Hz higher than actual and that the 25.6 Hz is thus actually tuned to be right at the first major beaming frequency of 23.2 Hz.

The fourth column in Table 3 shows the frequency at which the radiator vertical acceleration peaked during an idle shake test in which the idle speed was varied from 550 RPM (18.3 Hz) to 1200 RPM (40 Hz). For the sets of mounts tuned close to the first natural beaming frequency of the vehicle (23.2 Hz), the peak frequencies occurred around 21.5 Hz. The suspected reason for this lower than expected frequency is that the particular engine runs rough below 650 RPM (21.6 Hz) and produces higher torque pulses. It is believed that these higher torque pulses and the nearness of the first major beaming frequency causes the lower peak.

The fifth column in Table 3 shows the peak natural frequency measured on the radiator in the vertical direction in the frequency range above 15 Hz. Usually, the highest peak occurred at around 10 Hz and the vehicle with the dynamic absorber showed no difference in acceleration level in this region than for the case where the module was locked in place (not elastomerically suspended by the lower mounts). The suspended module did however show major changes in peak levels in the 15 to 30 Hz range. The tuned lower mounts peaked at around 18 Hz with secondary peaks at around 23 Hz. The cause of the lower peak is believed to be a front end natural beaming frequency of the vehicle around 19 Hz. The higher peak is believed to be the radiator responding to the first natural frequency of the vehicle.

Table 3 also shows some mounts labeled as being modified. These mounts were also conventional mounts but had rubber removed so as to tune them to provide dynamic rates in areas where there were gaps. Because of the loss in rubber, it is believed that some of these mounts also had damping characteristics different than original.

Figure 4:
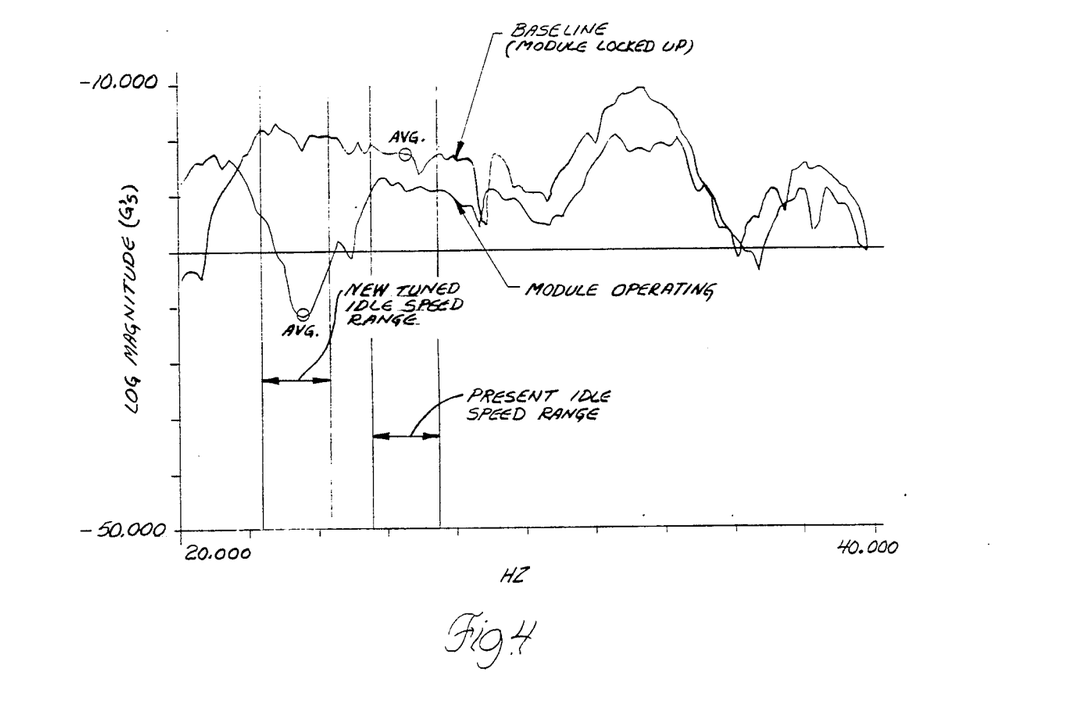
FIG. 4 is a graph comparing the vertical idle shake accelerations of the steering column with and without the operation of the dynamic absorber module in FIG. 2 including the tuning of both the module and engine according to the present invention.
Figure 5:
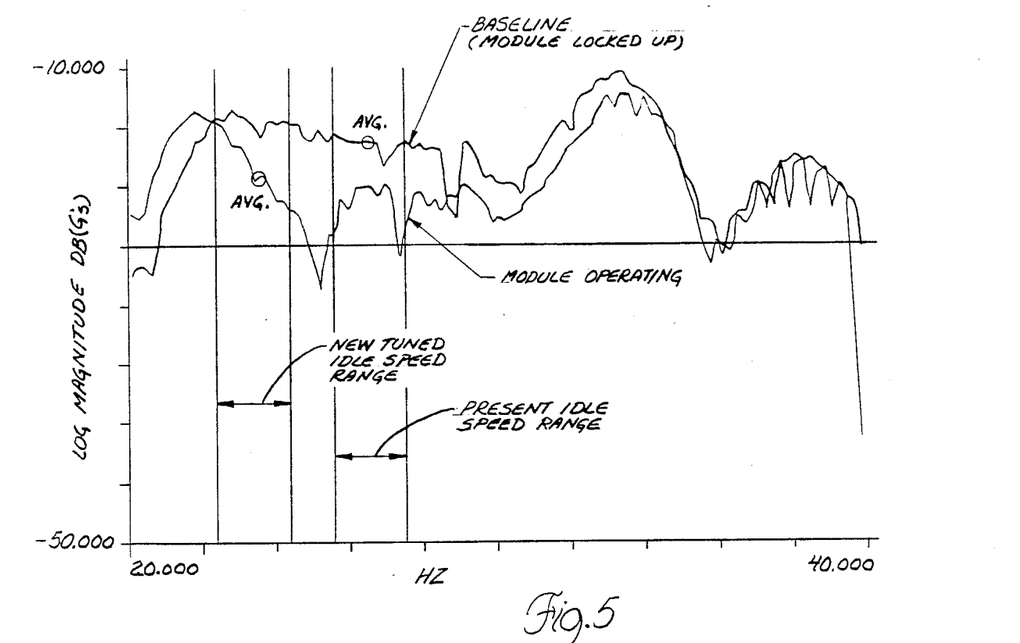
FIG. 5 is a graph like FIG. 4 but with the dynamic absorber tuned slightly above the first major beaming mode.
Figure 6:
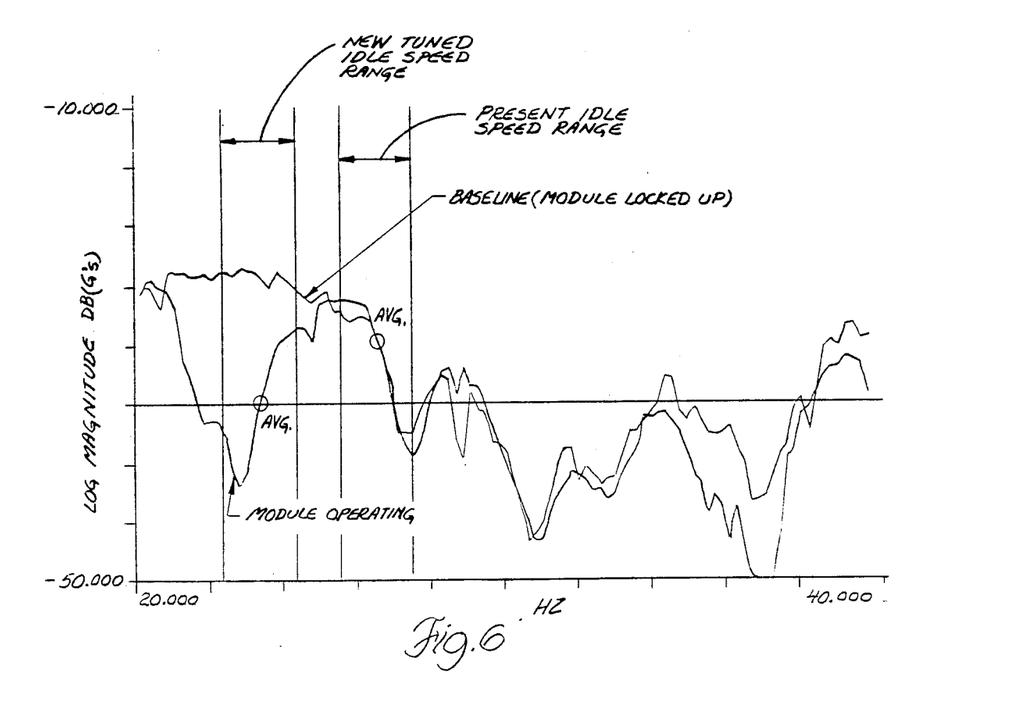
FIG. 6 is a graph like FIG. 4 but comparing the vertical idle shake seat track accelerations with and without the operation of the dynamic module in FIG. 2.
Figure 7:
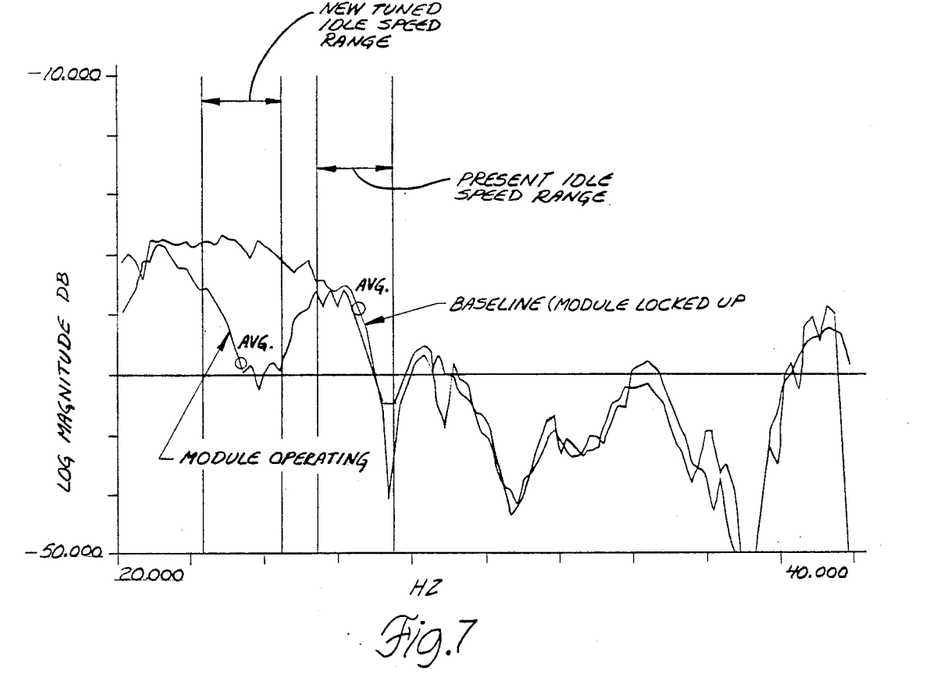
FIG. 7 is a graph like FIG. 6 but with the dynamic absorber tuned slightly above the first major beaming mode.

FIGS. 4 and 6 show the idle shake measurements for the steering column and the front seat track respectively with the 25.6 Hz calculated tuning rate mounts and with the dynamic module locked up, i.e. the module rigidly fixed rather than elastomerically supported on the unibody. Measurements were made in the vertical direction at the steering column hub, at the driver's inboard seat track near the rear end thereof and at the top of the radiator in the module. Shown on these figures is the normal idle speed of 800 RPM (26.7 Hz). In normal driving the vehicle was found to vary from this mean from 770 RPM (25.6 Hz) to 830 RPM (27.6 Hz). This variance is also marked on these figures along with a target level based on previous experience. FIG. 4 shows that if the idle speed was set at 708 RPM (23.6 Hz), a drop in the steering column shake level of 15 DB could be obtained from the average normal setting. FIG. 6 shows a similar drop of 11 DB in the vertical seat track acceleration if the idle speed was set at 690 RPM. In further testing, the idle shake data showed that as the tuning of the dynamic absorber was raised above the first natural frequency of the vehicle, the decrease became smaller and the width of the valley became narrower. FIGS. 5 and 7 show these effects on steering column shake and seat track shake respectively for the module tuned just 1.4 Hz higher using the aforementioned modified tuned mounts.

As will be appreciated then, the dynamic absorber is made most effective by tuning the module at or close to the first major beaming mode so that its mode shape provides the needed strong coupling to the torque input. Moreover, it is seen that the dynamic absorber module is most effective in producing lower idle shake levels by tuning both the idle speed and the module to the first major beaming mode.

Figure 8:
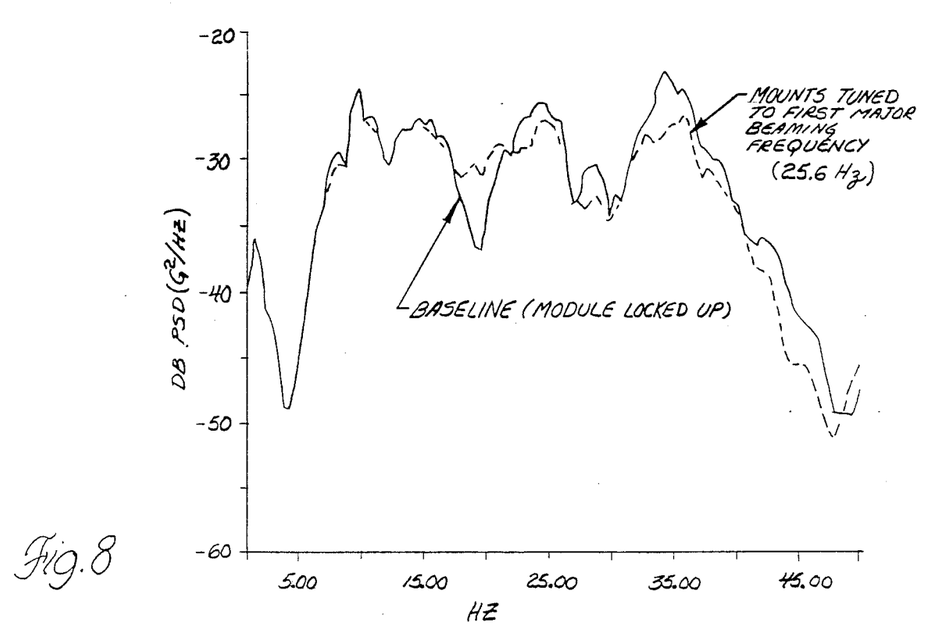
FIG. 8 is a graph like FIG. 4 but comparing the vertical rough road shake accelerations of the steering column with and without the operation of the dynamic absorber in FIG. 2.
Figure 9:
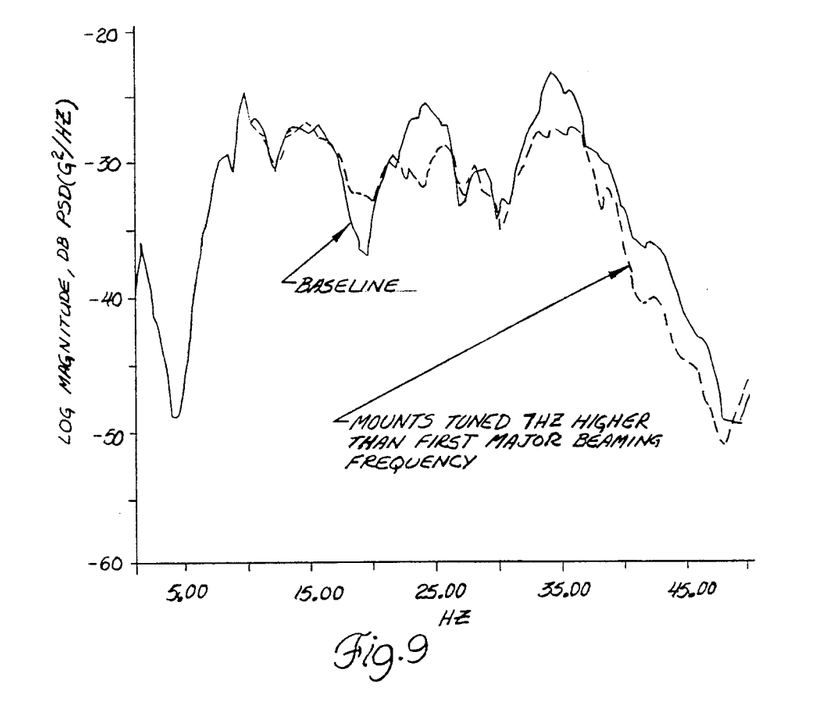
FIG. 9 is a graph like FIG. 8 but with the dynamic absorber tuned slightly above the first major beaming mode.

Rough road response effects were obtained by operating the vehicle on a rough road at 45 MPH and measuring the PSD (Power Spectral Density) acceleration levels in DBs ($G^2/Hz$) in all three directions (x,y,z) at the same places on the steering column, seat track and module identified above. The vehicle was again tested with the module left free to function with the different tuning rates and with the module locked up. FIGS. 8 and 9 show the steering column responses for both the 25.6 and 32.4 Hz tuning. Both curves show that the module reduced the steering column vertical acceleration levels significantly at the first major beaming and first steering column natural frequencies.

Figure 10:
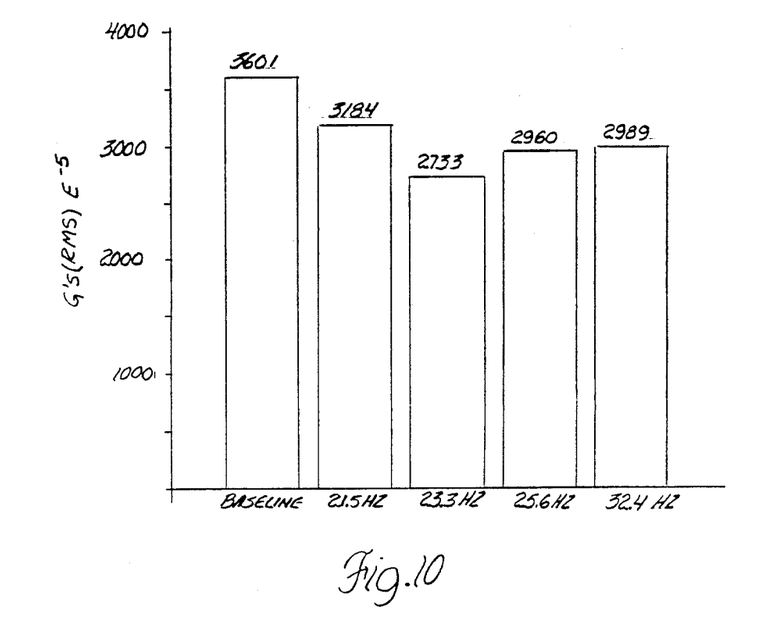
FIG. 10 is a bar graph of the rough road steering column acceleration response at a certain vehicle speed with and without the operation of the dynamic absorber in FIG. 2 with the latter tuned to various frequencies.
Figure 11:
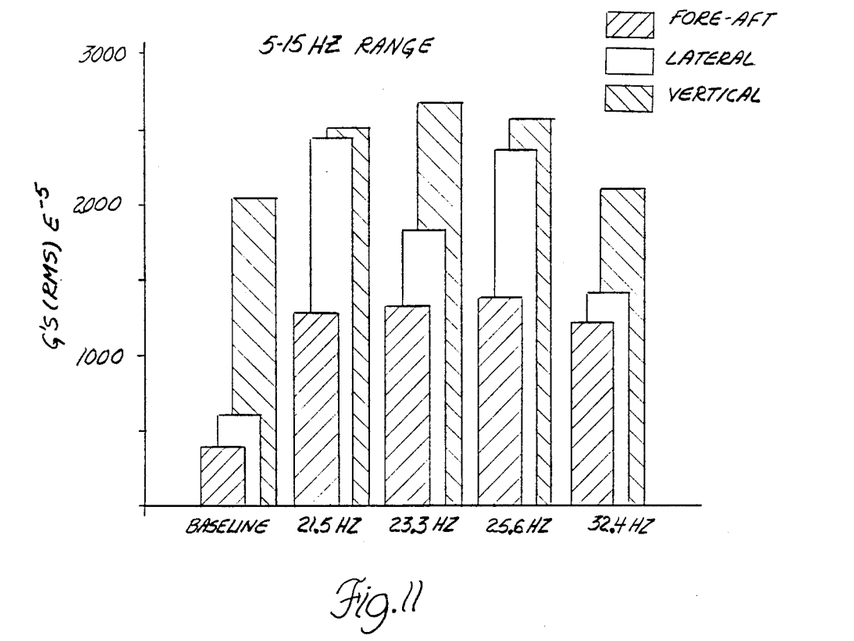
FIGS. 11 and 12 are bar graphs of the fore-aft, lateral and vertical rough road dynamic module acceleration response at a certain vehicle speed over two different road shake input frequency ranges and with the dynamic absorber tuned to various frequencies.
Figure 12:
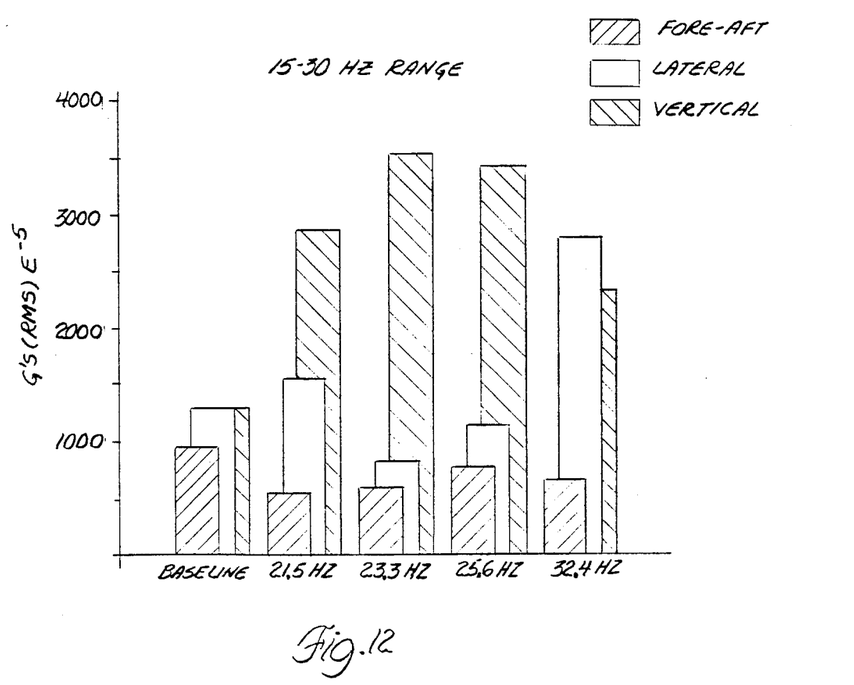

The steering column RMS acceleration levels for the 30 to 100 Hz frequency range are shown in FIG. 10 for the different tuning rates measured and with the module again locked to the chassis. The data shows that a significant increase in high frequency isolation was obtained by rubber isolating the radiator, fan and condenser. The module was found in this instance to have little effect however on seat track rough road shake. Road data showed that at the first major beaming natural frequency a valley occurred. A possible explanation for this phenomenon may be that an exhaust resonance in this range may have helped to dampen out the motion. Several exhaust modes having large motion at the catalytic converter (not shown) were measured in the 18 to 30 Hz range with the engine off. RMS acceleration measurements in the higher frequency range were comparable between runs for the seat track measurement.

It was also found that there can be a substantial production variation in the mount rates and thus in the intended tuning of the module yet significant improvement can still result. For example, a ±15% variation in mount rates would produce a maximum tuning variation of ±1.9 Hz or ±57 RPM. In the particular vehicle studied above and with the maximum variation given, the idle shake was still better by a factor of at least 12.5% at the steering column and seat track along with the potential for fuel economy gains by the lower than normal idle speed.

With the above specific application of the invention in mind, there will now be described the preferred procedure for generally implementing the invention.

PREFERRED PROCEDURE FOR DESIGNING THE MODULE AS A DYNAMIC ABSORBER

Date Needed

The following data needs to be obtained either by measurement or by estimation:

Either measure each part individually or measure the mass of the total package recognizing that only the latter is needed.

| | | | |
|---|---|---|---|
| Mass of the radiator | $M_r$ | _____ | kg |
| Mass of the water in the radiator (Density 1 kg/liter) | $M_w$ | _____ | |
| Mass of the AC condenser | $M_a$ | _____ | |
| Mass of the Freon in condenser (assume density of 1 kg/liter) | $M_c$ | _____ | |
| Mass of the fan | $M_f$ | _____ | |
| Mass of the support to hold components together | $M_s$ | _____ | |
| Total mass of module | $M_t$ | _____ | |

Either measure the center of gravity (CG) of each part individually or measure the CG of the total package recognizing that only the latter is needed. The CG of the radiator and condenser can be approximated as being at their midpoints. The fan CG, on the other hand, is approximately at the midpoint of its motor. A rough assumption is that the center of the module is close to the midpoint of the radiator.

| | X | | Y | | Z | |
|---|---|---|---|---|---|---|
| Center of gravity of radiator | $X_r$ | _____ | $Y_r$ | _____ | $Z_r$ | _____ |
| Center of gravity of condenser | $X_a$ | _____ | $Y_a$ | _____ | $Z_a$ | _____ |
| Center of gravity of fan | $X_f$ | _____ | $Y_f$ | _____ | $Z_f$ | _____ |
| Center of gravity of support | $X_s$ | _____ | $Y_s$ | _____ | $Z_s$ | _____ |
| Center of gravity of module | $X_m$ | _____ | $Y_m$ | _____ | $Z_m$ | _____ |

$X_M = [(M_r + M_s) \times X_r + (M_a + M_c) \times Y_a + M_f X_f + M_s X_s]/M_t$
$Y_M = [(M_r + M_s) \times Y_r + (M_a + M_c) \times Y_a + M_f Y_f + M_s Y_s]/M_t$
$Z_M = [(M_r + M_s) \times Z_r + (M_a + M_c) \times Z_a + M_f Z_f + M_s Z_s]/M_t$ Either determine or estimate the beaming natural frequencies of the vehicle in the 20 to 30 Hz range and the designated idle speed of the vehicle. Furthermore, the idle speed should not be changed with the AC compressor turned on so that the module can be tuned to cover both the AC and non AC case. The idle speed should also be set to the same frequency as the first beaming natural frequency of the vehicle.

| | | | |
|---|---|---|---|
| 1st beaming natural frequency of the vehicle | $F_b$ | _____ | Hz |
| Idle speed (RPM/30 = _____ Hz) | $F_i$ | _____ | Hz |
| Idle speed lower boundary [RPM − 25)/20 = Hz] | $F_{il}$ | _____ | |
| Idle speed upper boundary [(RPM + 25)/30 = Hz] | $F_{iu}$ | _____ | |

With the above information, it is then possible to determine the total mounting stiffness using the well known simple sprung mass formula simplified as follows:

$$\text{Total mounting stiffness } (K_t) = (F_b)^2 \times 0.0395 \times M_t$$

Moreover, it has been found that the type of transmission (automatic or manual) has an effect on the tuning with respect to road shake. For example, for a 4-cylinder engine with manual transmission, it was found that the optimum rough road shake improvement occurred when the module support mounts were tuned 4 Hz higher than the first beaming mode of the vehicle.

Mounts for the Module

It is preferred that the module be supported using only two main support mounts. At the upper module support, whatever mounts are used should be designed only to prevent large motions in the fore-aft and lateral directions. The reason for this preference is that with, for example, a four support mount system, there is a strong potential for the system to be bound up unless all three or four mounts are located exactly to design. With the two support mount system there is less chance for binding and hence it will be less build sensitive.

Main support mounts

The vertical dynamic stiffness of each mount should be half of of the Kt value calculated above. This dynamic mount rate should be tested at the idle speed frequency (Fi) or 25 Hz and at an amplitude of $+-0.25$ mm and at a preload equal to one half the mass of the module. Test mounts are then obtained at rates several durometers above and below this nominal setting for prototype development. The dynamic stiffness rate of the mount in the other directions are not very important and need not be specified. Generally, it is best to make them as stiff as possible. Shear type mounts are preferred since they provide the lowest ratio of vertical stiffness rate to side stiffness rates.

In addition, it is preferred that the mount have as high a damping as possible with the given design. This allows the module when acting as a dynamic absorber to have as wide an effect as possible thereby covering a wide idle speed range. This will, however, reduce its effectiveness at its tuning frequency but will prevent a strong valley feel.

The $+-15\%$ variation in the dynamic stiffness of the mounts should be checked to see what effect it will have on the tuning of the module's natural frequency. In general, it will be about a $+-1.9$ Hz variation or $+-57$ RPM change as earlier discussed. The effect of this production variation may create problems if the first beaming natural frequency also varies considerably.

Furthermore, it is preferred that the mounts have stops built into them to prevent large excursions on extremely rough roads. As a rule of thumb, the stop should prevent motions slightly greater than the largest estimated on an average rough road so that the module can perform as a dynamic absorber even on the average rough road. The stops should also take into account the static displacement of the mounts due to the mass of the module on these mounts. The static stiffness rate of the mount is used to calculate the static displacement but if this rate is not available, 75% of the dynamic rate can be used as an estimate.

Upper Mounts

These mounts are designed so that they only prevent large motions in the fore-aft and lateral directions. It is important that they do not add stiffness in the vertical direction with less than the maximum expected module displacement. These mounts should act only as restrictors. Furthermore, the upper radiator hose should not be allowed to bind up these mounts as this would alter the tuning of the module.

Location of the Main Mounts

In order to produce a pure bounce natural frequency of the module, it is important that the main mounts be properly located. In the fore-aft location, the two main support mounts should be close as practical to the antinode and at the same fore-aft coordinate as the module center of gravity or roughly under the radiator if it is sandwiched between the fan and the AC condenser.

In the lateral direction, the main mounts should be equally distant from the module center of gravity. They may mean that the mounts may not be symmetric to the centerline of the vehicle, particularly if the radiator is off-center.

All components should be structurally tied into some sort of support to which the main mounts are attached. This is necessary to insure that all components move together as a unit particularly in the frequency range in which the module is acting as a dynamic absorber. Otherwise, their durability may be affected due to the higher levels of acceleration encountered at the tuning frequency. Preferably, a pan or cradle design is used with the AC condenser and fan fixed to the radiator and the radiator fixed to the pan.

Location of the Upper Mounts

The only function of the upper mounts is to act as stops and they are preferably located overhead of the module so that they can act together under severe road conditions.

Testing Procedures

Once the module is installed in a vehicle, the following tests should be performed to check out the design. First, the module should feel flexible in the vertical direction. If it does not, it may be bottomed out against the body and cause erroneous testing. Each time the mounts are changed, the feel should be checked.

Second, a hammer impact test should be performed on the module to determine its tuning frequency. An accelerometer should be placed on the module and the module struck with an impact hammer. Furthermore, it is desirable to ground out the body of the vehicle since its first beaming resonance may override the module resonance. Otherwise, two peaks may show up on the frequency curve and it may not be clear as to which peak is the module tuning. Also its tuning resonance will be shifted by the vehicle beaming natural frequency. And thus it may be desirable to perform this test with main mount rates higher and lower than the predicted rates.

Third, an idle shake test should be performed on the vehicle so as to determine the effect of the module on the idle shake levels at the steering wheel and the seat track. Generally, only the vertical directions at these points need to be measured. The acceleration levels on the module may also be measured at this time to verify its tuning natural frequency. It is recommended that this standard test be performed with the hood closed, a full tank of gas, 100 pounds on the driver seat, and 50 pounds on the floor where the driver's feet are normally located. Again, it may be desirable to perform this test with various rate mounts so as to determine the ideal tuning and to also rerun the test with the module grounded out. This would provide a baseline from which it could be determined how much the module is helping in reducing the idle shake levels.

A final test that should be performed is to determine the best tuning frequency for rough road shake. In this test, the vehicle is driven over a semi-rough road and the acceleration at the steering column, seat track and module are measured. This test should be performed with the various mount rates and with the module grounded out as a baseline. This test will disclose if there is any extra benefit to having a different set of mount rates for a manual transmission vehicle so as to tune them only for rough road shake. Generally, however, idle shake on manual transmission vehicles is not a problem.

The above described preferred embodiment is illustrative of the invention which may be modified within the scope of the appended claims.

The embodiments of the invention in which an exclusive property or privilege is claimed are defined as follows:

1. A dynamic absorber for a motor vehicle having a vehicle body with an inherent first beaming mode and an accompanying anti-node location, an engine cooled with a radiator over which air is circulated by a fan and an air conditioning system including a condenser characterized by module means comprising at least the radiator and condenser, elastomeric mount means firmly supportively mounting said module means on the vehicle body with the center of gravity of said module means located approximately at said anti-node location, said module means having a natural frequency made substantially equal to said first beaming mode, and said engine having an idle speed set substantially equal in a frequency sense to said first beaming mode.

2. A dynamic absorber for a motor vehicle having a vehicle body with an inherent first beaming mode and an accompanying anti-node location, an engine cooled with a radiator over which air is circulated by a fan and an air conditioning system including a condenser characterized by module means comprising the radiator and condenser and fan supported by a module support, elastomeric mount means firmly supportively mounting said module support on the vehicle body with the center of gravity of said module means located approximately at said anti-node location, said module means having a natural frequency made substantially equal to said first beaming mode, and said engine having an idle speed set substantially equal in a frequency sense to said first beaming mode.

3. A dynamic absorber or a motor vehicle having a vehicle body with an inherent first beaming mode and an accompanying anti-node location, an engine cooled with a radiator over which air is circulated by an electric fan and an air conditioning system including a condenser characterized by module means comprising the radiator and condenser and fan supported by a module support, the condenser and fan sandwiching and fixed to the radiator, the radiator fixed directly to said module support, a pair of shear type elastomeric mount means firmly supportively mounting said module support on the vehicle body with the center of gravity of said module means located approximately at said anti-node location, said module means having a natural frequency made substantially equal to said first beaming mode, and said engine having an idle speed set substantially equal in a frequency sense to said first beaming mode.

* * * * *